Dec. 31, 1957  H. J. EVANS  2,818,046
GAS METERS
Filed Aug. 28, 1953  5 Sheets-Sheet 2
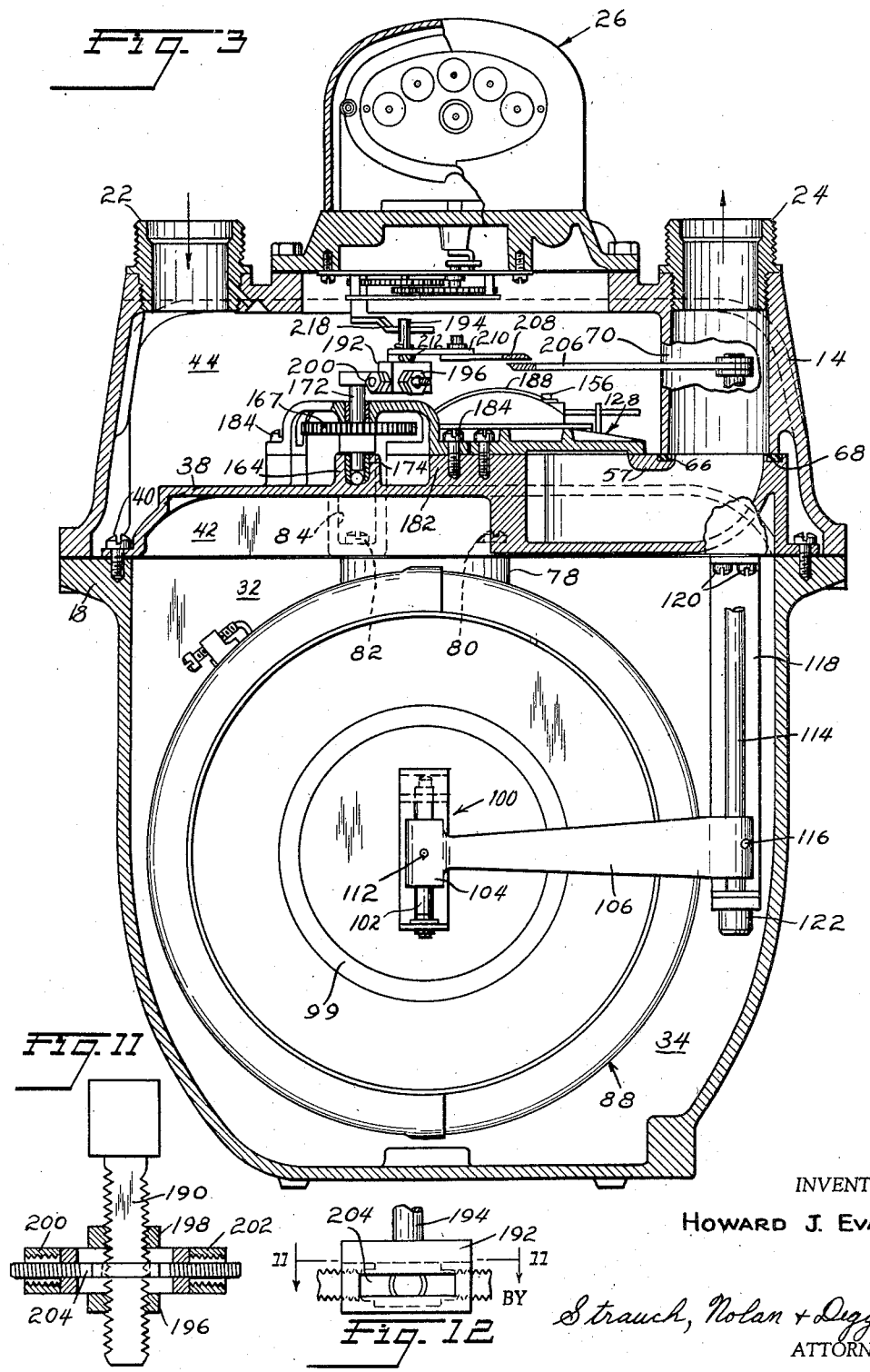
INVENTOR
HOWARD J. EVANS
BY Strauch, Nolan & Diggins
ATTORNEYS

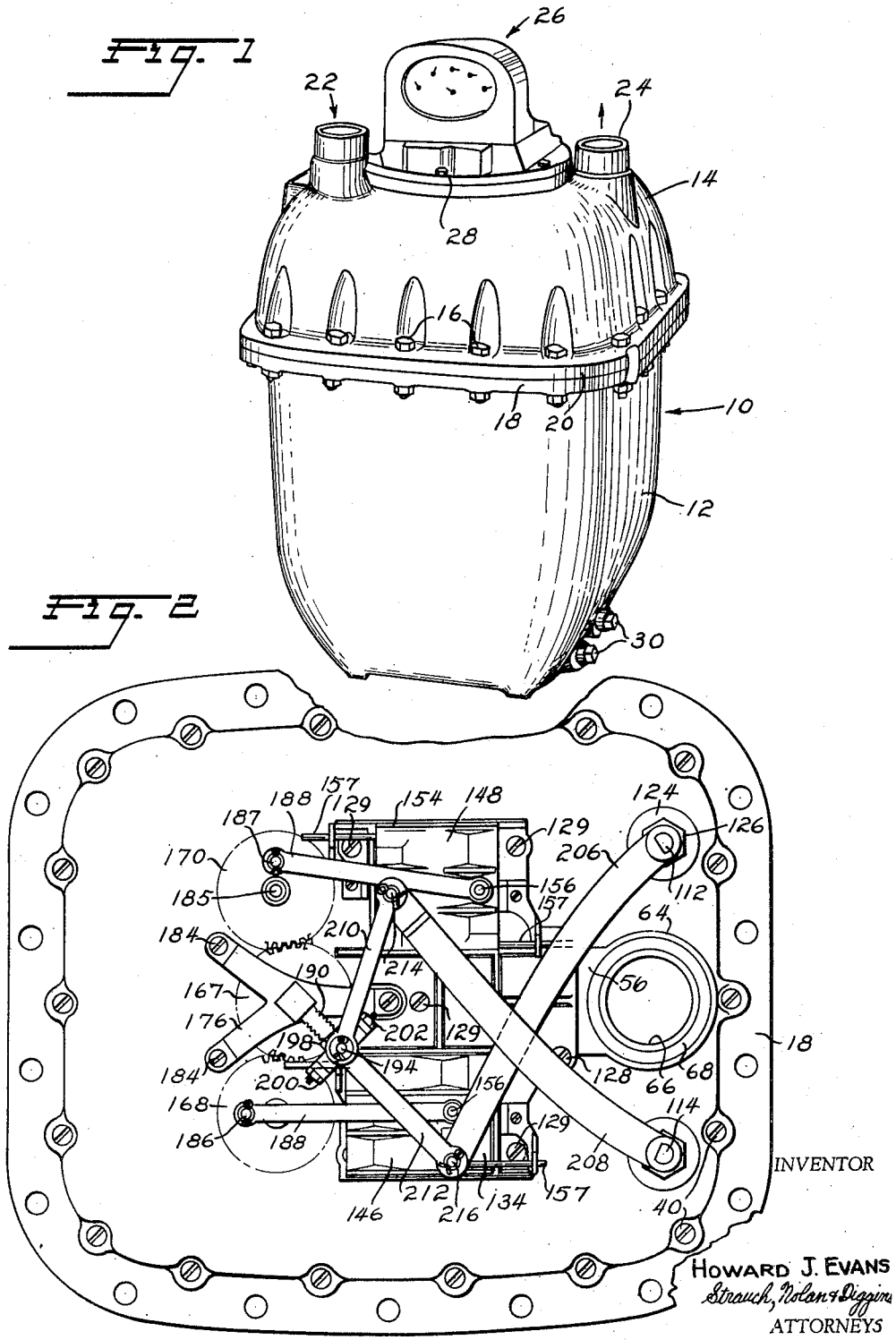

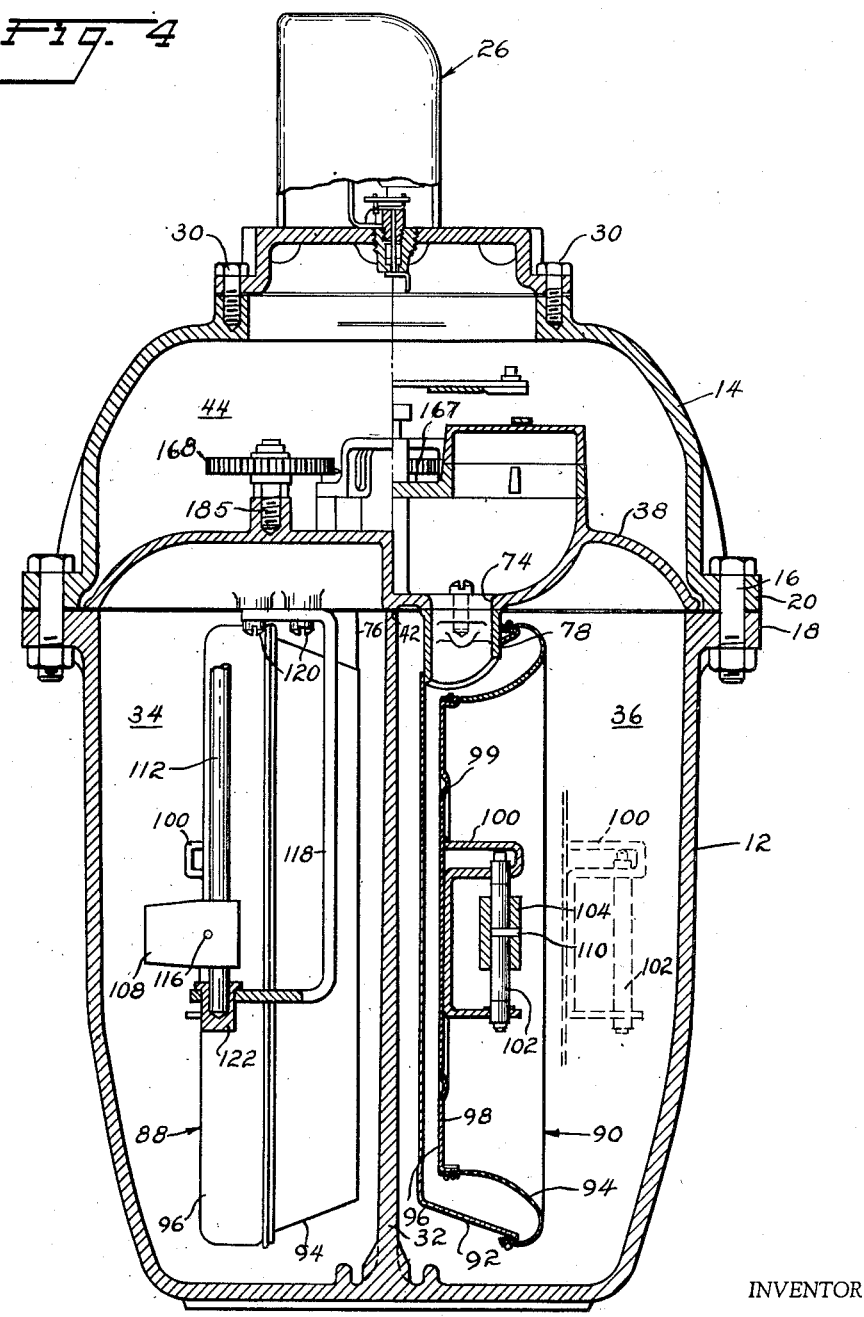

Dec. 31, 1957  H. J. EVANS  2,818,046
GAS METERS
Filed Aug. 28, 1953  5 Sheets-Sheet 4

INVENTOR
HOWARD J. EVANS

BY *Strauch, Nolan & Diggins*
ATTORNEYS

Dec. 31, 1957 H. J. EVANS 2,818,046
GAS METERS
Filed Aug. 28, 1953 5 Sheets-Sheet 5

INVENTOR
HOWARD J. EVANS
BY Strauch, Nolan & Diggins
ATTORNEYS

United States Patent Office 2,818,046
Patented Dec. 31, 1957

2,818,046
GAS METERS

Howard J. Evans, Pittsburgh, Pa., assignor to Rockwell Manufacturing Company, Pittsburgh, Pa., a corporation of Pennsylvania Application August 28, 1953, Serial No. 376,853

14 Claims. (Cl. 121—48)

This invention relates to gas meters and is particularly concerned with the valve construction and actuating means, and with the general improvement and increased efficiency of operation of gas meters as a whole.

The invention in its preferred embodiment provides a gas meter for chiefly industrial use which fills the needs of industry for a meter that is intermediate in size between the usual domestic household meter and the usual large capacity meters available to industry. It is a positive displacement type meter wherein the measuring mechanism, valves, valve seat, valve plates and bellows units are all easily removable for repair or replacement. The valves are side guided and they are gear driven for accurate synchronization and smooth operation. The entire meter is of extremely light weight for its capacity but is rugged enough for industrial use.

The major object of the invention is the provision of an improved large capacity duplex bellows type meter which is compact in its dimensions, efficient in operation, and simple in construction.

A further object of the invention is to provide a novel valve plate assembly in a gas meter.

Another object of the invention is the provision of a top connected gas meter having a demountable top mounted register.

A further object is to provide an improved and simplified side guided valve assembly which enhances operational efficiency and facilitates maintenance.

Still another object of the invention is the provision of improved and simplified guides for reciprocating slide valves which permit rapid and easy removal and installation of the valves.

A further object of the invention is to provide gear and crank link operated slide valves in which the effective length of the crank link is increased to reduce side thrust without increase in the space required for the valve mechanism.

These and further subordinate objects will be apparent to persons conversant with the art from a reading of the following description of a preferred embodiment of the invention in conjunction with the subjoined claims and annexed drawings in which:

Figure 1 is a perspective elevation of the meter in completely assembled condition;

Figure 2 is a top plan view of the meter of Figure 1 with the cover removed to show the control valves and operating linkage therefor;

Figure 3 is a transverse central section through the meter housing and valve assembly with the bellows and portions of the register housing shown in elevation;

Figure 4 is a compound section through the meter housing and portions of the internal structure;

Figure 11 is a section on line 11—11 of Figure 12 showing details of the tangent arm adjustment; and Figure 12 is an elevation of the tangent arm adjustment.

Figure 5:
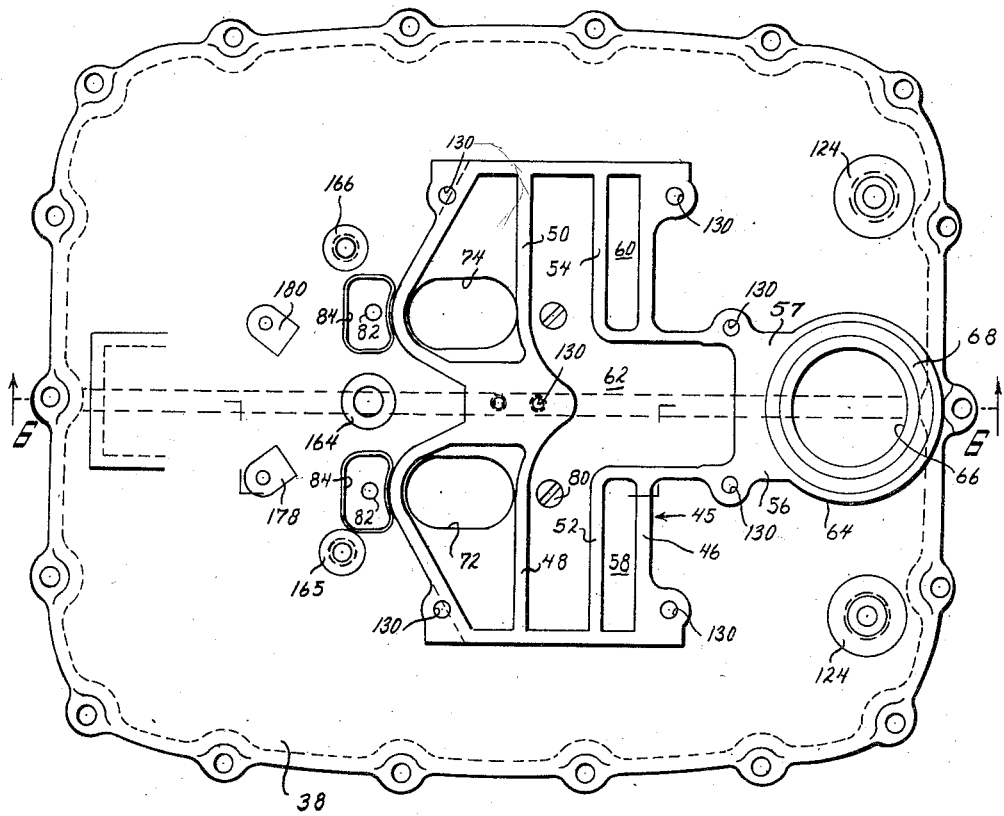
Figure 5 is a top plan view of the valve plate with the valve seat and valve mechanism removed.

Referring to Figure 1, numeral 10 indicates generally a two-part meter housing consisting of a bottom body 12 and a cover 14 secured together by a plurality of bolt assemblies 16 passing through mating marginal flanges 18 and 20 on the body and cover respectively. On the top of cover 14 is provided a tubular inlet fitting 22 for connection to a supply line (not shown), a tubular outlet fitting 24 for connection to a service line (not shown). A register subassembly 26 is detachably secured to the cover member as by screws 28. The housing is preferably a casting of aluminum alloy or similar light weight material and contains removable drain plugs 30 adjacent the bottom of body 12.

As best appears in Figures 3 and 4, body 12 is internally divided by a central vertical partition 32 to form, with the side walls of the housing, two isolated measuring chambers 34 and 36 of the same size. The open upper ends of the measuring chambers terminate in a common plane with the upper edge of web 32 and are closed by a valve plate 38 secured to the inner marginal edges of body flange 18 by a plurality of cap screws 40 as shown in Figure 2. The valve plate is formed with a longitudinal rib 42 on its underside which sealingly engages the upper edge of body web 32 to completely segregate the measuring chambers, suitable gaskets being provided between the mating surfaces of the body and the cover and valve plate to prevent leakage of gas.

Cover 14 encloses a unitary valve chamber 44 above valve plate 38, which chamber contains the valve assembly, hereinafter described, and acts as a plenum for incoming gas entering through inlet connection fitting 22.

Figure 6:
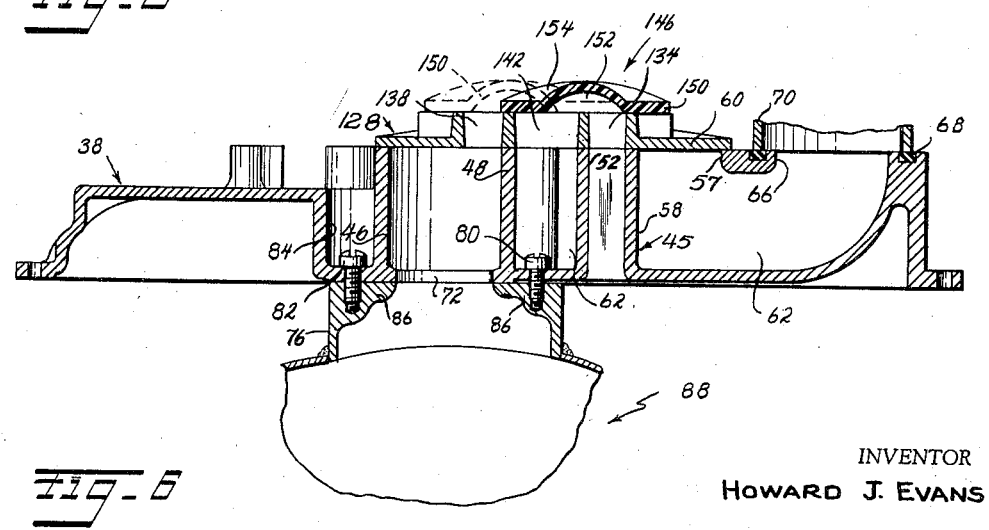
Figure 6 is a section through the valve plate on line 6—6 of Figure 5.
Figure 7:
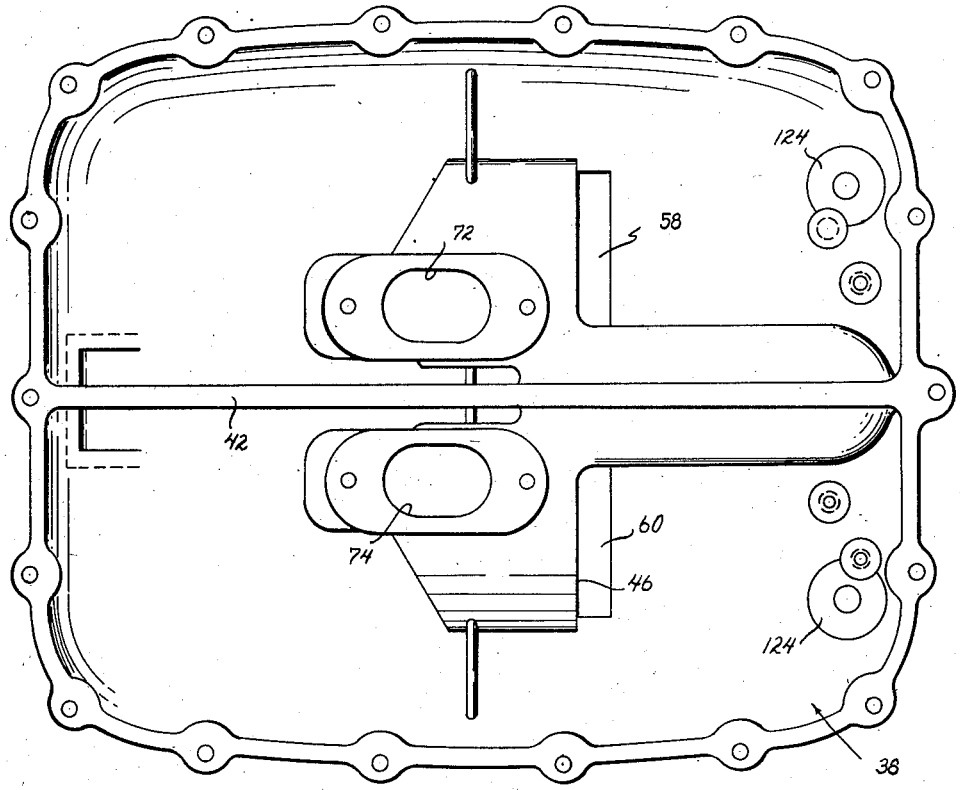
Figure 7 is a bottom plan view of the valve plate of Figure 5.

Referring to Figures 5 and 6, the upper surface of valve plate 38 which is a casting of the same alloy as the body and cover is formed with a raised valve seat boss 45 consisting essentially of a continuous bounding side wall 46, a plurality of internal webs 48, 50, 52, 54 and a parallel walled extension 56 all of which have their upper edge surfaces in a common plane.

Webs 52 and 54, with the adjacent portions of side wall 46, define rectangular vertical passages 58 and 60 always open through plate 38 into measuring chambers 34 and 36, respectively and, with webs 48, 50 and the walls of extension 56, define a generally T-shaped closed bottom exhaust channel 62.

Extension 56 terminates in a bridge 57 and a cylindrical boss 64 containing an upwardly open concentric port 66 in communication with channel 62 and having an annular groove containing a resilient seal ring 68 surrounding the port. The lower end of a tubular boss 70 integrally formed on the inner wall of cover 14 seats on seal ring 68 (see Figure 3) and is internally threaded at its upper end to receive exhaust connection fitting 24, thus placing channel 62 in direct communication with the service line (not shown) when the meter is installed.

In the regions bounded by side wall 46 and webs 48 and 50, respectively, valve plate 38 contains spaced oblong ports 72 and 74. Hollow bracket members 76 and 78 oblong in cross-section are secured to the underside of plate 38 in alignment with ports 72 and 74 by cap screws 80 and 82 inserted, respectively, through the bottom wall of channel 62 and recesses 84 in the plate 38 and threaded into suitably thickened wall sections 86 of the bracket members.

Suspended from the valve plate by means of brackets 76 and 78 are diaphragm type bellows 88 and 90 disposed in respective chambers 34 and 36 to act as secondary measuring chambers. Preferably, these bellows units are of the construction described and claimed in United States Patent No. 2,514,388. For the purposes of this present explanation, it will therefore suffice to state that each bellows unit includes a fixed pan 92 having an outwardly flared circumferential wall to which the outer edge of a flexible diaphragm 94 is attached. The central portion of this diaphragm is clamped between inner and outer clamp plates 96 and 98, respectively, the outer plate being formed with an annular reinforcing embossment 99 to increase its rigidity.

Tubular neck portions 76 and 78 extend through suitable apertures in the circumferential walls of the respective fixed pans and are welded or otherwise fixed leak tight to the pans.

Referring to Figures 3 and 4, trunnion brackets 100 are permanently secured to the central portion of the outer clamp plates 98 to rotatively receive the ends of vertical trunnion pins 102, the midportions of which are surrounded by apertured bosses 104 on the ends of respective horizontal connecting arms 106 and 108 and fixed thereto as by pins 110. As fully disclosed in copending application Serial No. 376,862 filed on even date herewith, the spheroidal upper end of trunnion pins 102 pivotally support substantially the entire weight of clamp plates 96 and 98 as well as a substantial portion of the weight of diaphragms 94.

The opposite ends of arms 106 and 108 with respect to bosses 104 are fixed to the lower portion of vertical flag rods 112 and 114 as by pins 116. Generally C-shaped flag rod brackets 118 are secured to the underside of plate 38 by screws 120 and are fitted with socket type step bushings 122 rotatably supporting the lower ends of the flag rods. The upper ends of the flag rods pass through stuffing boxes taking the form of apertured bosses 124 in plate 38 and terminate in valve chamber 44 where they are drivingly connected with the control valves as will be described. Bosses 124 contain packing material compressed by gland nuts 126 to prevent leakage of gas around the flag rods.

A valve seat member 128 preferably a unitary casting of said alloy, is secured to the upper surface of valve seat boss 45 as by a number of threaded fasteners 129 engaging the tapped holes 130 (Figure 5). Angularly related webs 131 on valve seat 128 have coplanar valve seat surfaces 132 and define two spaced groups 133 and 135 of three parallel adjacent ports, each group consisting of corresponding rectangular ports 134 and 136 registered with passages 58 and 60, respectively; corresponding ports 138 and 140 spaced from respective ports 134 and 136 and in communication with ports 72 and 74, respectively; and corresponding intermediate ports 142 and 144, both of which communicate with exhaust channel 62. Intermediate ports 142 and 144 are bridged by a cross-web 146 which structurally reinforce the casting 128.

Figure 10:
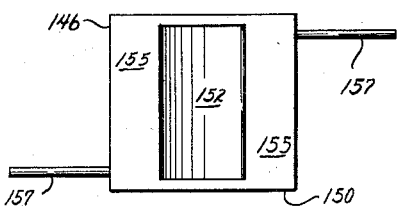
Figure 10 is a bottom plan view of one of the valve members.

The respective groups of ports 133 and 135 are each controlled by slide valves 146 and 148, one of which is shown in detail in Figure 10 and comprises a rectangular body member, formed of a hard plastic such as Bakelite or similar material which slides with respect to the valve seat and is dimensionally stable under service conditions having end flanges 150 spaced by a convex mid-portion defining an arcuate recess or chamber 152 on the underside. A plurality of parallel arcuate reinforcing ribs 154 (Figure 2) formed on the upper surface of the valve members merge at their mid-portion with the convex portion of the body member to give extreme rigidity to the valve member to prevent warping. The flat undersurfaces 155 of flanges 150 are accurately formed to lie in a common plane in slidable sealing contact with the valve seats surfaces 132. At one end and mid-way between the lateral edges thereof, the valve members are provided with metallic pivot studs 156 extending upwardly from and perpendicularly to the respective flange and, at diagonally opposite corners, are provided with oppositely extending rigid parallel guide rods 157 in a common plane parallel to the surfaces 155 of flanges 150. Studs 156 and rods 157 are preferably moulded into the valve.

Figure 8:
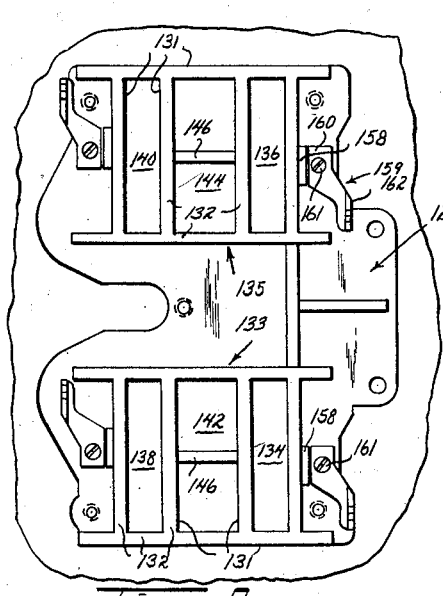
Figure 8 is a top plan view of the removable valve seat element.
Figure 9:
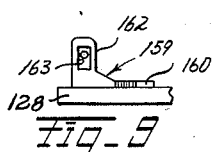
Figure 9 is a detail elevation of one of the valve guide brackets.

Adjacent the ends and intermediate the lateral edges of each group 133 and 135 of valve ports, valve seat 128 is formed with a raised rectangular boss 158. Identical valve guide brackets 159 are secured to the valve seat adjacent each boss by screws 161 passing through a planar base 160 of the bracket. The edge of the base 160 next to the boss is coextensive therewith and slightly spaced therefrom for a purpose appearing below. Laterally offset and spaced from the base portion 160 and perpendicular thereto, guide bracket 159 has an upwardly extending lug 162 containing a slot 163 having its major axis vertical and adapted to slidably receive and vertically guide rods 157 of the valve members and preventing sidewise displacement of the valve members on the valve seat. As shown in Figure 8, the guide brackets for each valve are mounted in oppositely facing relation with the upstanding lugs 162 adjacent a respective lateral edge of the valve members. Thus, the guide brackets and rods 157 coact to constrain the valve member to a rectilinear path of movement, preventing lateral or rotary displacement. The brackets are preliminarily located, on assembly, in a position of proper alignment by respective bosses 158 and are then adjustable by loosening screws 161 to perfect alignment.

Guide rods 157 are only slightly greater in length than the stroke or travel of the valve members between limit positions. The limit positions are defined by the crank links 188 as hereinafter explained and lugs 162 are located beyond the limit positions. Consequently, when links 188 are disconnected, valves 146 and 148 may be easily removed by moving them beyond the limit position in either direction whereby the guide rod at the opposite end will be disengaged from the associated guide bracket.

Three raised apertured cylindrical bosses 164, 165 and 166 are formed on valve plate 38 adjacent the opposite end of valve seat boss 45 with respect to extension 56, to rotatably mount a like number of identical meshing spur gears 167, 168 and 170.

Intermediate gear 167 is fixed to a live shaft 172 which has its lower end journaled in a step bearing 174 in boss 164 and its upper end journaled in and extending through a Y-shaped yoke or bracket 176 mounted on triangularly spaced tapped bosses 178, 180, 182 on valve plate 38 as by threaded fasteners 184. Gears 168 and 170 are journaled on fixed studs 185 threadedly disposed in bosses 165 and 166, respectively, and each has a crank pin 186 and 187 to which are pivotally connected one end of crank links 188 having opposite ends pivotally connected to studs 156 on the respective valve members. The ends of links 188 are coplanar and the intermediate portion of the links is turned to extend over the associated valve members with adequate operating clearance (see Figure 3). It is pointed out that the crank links 188 are connected to the valve members at the ends of the valve member remote from the respective drive gear. This makes the links as long as possible without increasing the overall dimensions of the valve assembly, the maximum length of the links being desirable to reduce side thrust. As shown in Figure 2, gears 167, 168 and 170 are so meshed that crank pins are 90° out of phase.

The upper end of gear shaft 172 is non-rotatably secured to one end of a threaded horizontal tangent rod 190. The rod 190 has upper and lower flat sides to provide guide surfaces for slidably supporting an adjustment block 192 having a rigid upstanding pin 194. Nuts 196 and 198 threaded on rod 190 determine and maintain the desired longitudinal spacing between the axes of shaft 172 and pin 194. Block 192 is suitably slotted so as to be slidably adjustable in either direction at right angles to the axis of pin 194, this adjustment being effected and maintained by nuts 200 and 202 and a cross guide member 204 passing through adjustment block 192. Specific details of a tangent adjustment of this nature are disclosed in United States Patent No. 1,723,397 to Armstrong to which reference is made for further detail necessary to understand the present invention.

The upper ends of oscillatable flag rods 112 and 114 extending through gas tight bushings into chamber 44 have the ends of horizontal levers 206 and 208 nonrotatably secured thereto. These levers are disposed at slightly different levels so as to cross without contact as illustrated. Horizontal links 210 and 212 have their opposite ends freely pivotally connected at 214 and 216 to levers 206 and 208 and to pin 194 so that oscillation of either or both flag rods causes tangent rod 190 to rotate shaft 172 and gear 167 which in turn rotates gears 168 and 170 in obvious manner. Rotation of gears 168 and 170 imparts, through the medium of pin connected crank links 188, simple harmonic rectilinear reciprocation to valve members 146 and 148, which reciprocation is approximately 90° out of phase. Register 26 is driven by pin 194 contacting a register drive arm 218 operatively connected to the usual counter mechanism of the register.

When valve members 146 and 148 are at the right hand limit position of their strokes (Figure 2) ports 138 and 140 are fully open and ports 134 and 136 are placed in communication with ports 142 and 144 by the arcuate chamber 152 of the valve member which, in this position bridges the webs between said ports. In the left hand limit position of the valves, ports 134 and 136 are fully uncovered and ports 138 and 140 are placed in communication with ports 142 and 144, respectively. Of course due to the 90° out of phase relation of the drive gear connections, the valves are never at a limit position at the same time. At the mid-point of the stroke, all three ports in a group controlled by a respective valve are covered, the flanges covering the end ports of the group and the arcuate chamber 152 overlying the intermediate port, chamber 152 being of the same width and length as ports 142 and 144.

In operation, gas under pressure enters through connection 22 filling chamber 44 and, assuming the valves to be in the position shown in Figure 2, passes through port 134 and passage 58 to measuring chamber 34 and collapses bellows 88 forcing the gas therein from a previous cycle out through ports 72 and 138, through chamber 152 of valve 146 to channel 62 and exhaust connection 24 to the service line. As bellows 88 collapses, arm 106 pivots flag rod 114 and lever 208 clockwise as viewed in Figure 2. This causes counterclockwise rotation of gear 167 and tangent rod 190, driving the register mechanism and simultaneously gear 167 drives gear 168 and 170 clockwise. Gear 168 and the associated link 188 moves valve member 146 to the right in Figure 2, progressively closing port 134. Meanwhile gear 170 is moving valve 148 to the right from the mid-position shown in Figure 2, thus opening port 140 to admit gas from chamber 44 through port 74 to bellows 90 which has been collapsed in the previous cycle. By the time valve member 148 has reached the right hand limit position in which port 140 is fully opened and starts its reverse movement, valve member 146 has passed mid-position and starts opening port 138 to admit another charge to the bellows 88. Simultaneously the arcuate chamber 152 of valve member 146 bridges ports 142 and 134 (see Figure 6) so that as the bellows 88 expands, gas displaced from chamber 34 thereby exhausts through ports 58, 134, 142 and channel 62 to the service line.

From the foregoing it will be appreciated that the volume of gas exhausted from the bellows as it is collapsed is the same as that displaced from the associated chamber when the bellows is re-inflated or expanded. Thus, for each complete reciprocation of one valve, two equal volumes of gas are passed from the chamber 44 to the service line. The interval between these two volumes is slight because due to the simple harmonic motion of the valve, maximum velocity occurs during the mid-portion of each stroke while the valve "dwells" at each end of the stroke to insure optimum volumetric efficiency. Furthermore, due to the 90° out of phase relation of the valves, the total effective flow through ports 134, 136, 138 and 140 at any given time is substantially constant and equal to the area of one of the ports, thus eliminating surges in gas flow.

The parallel arrangement of the valves is more compact than the conventional angulated valves eliminating the space required for the valves as a factor in determining the lateral dimensions of the meter. An addition, valve operation is smoother and the valve guide construction less complex. In this regard it is pointed out that since no part of the lazy tong linkage 206, 208, 214 and 216 is directly connected to the valve members, there is no tendency for the valve members to be tipped on their seats or unevenly worn by the weight of and forces exerted by this linkage. The simplified guide construction is required only for the minute amount of side thrust resulting from the angularity existing between the links 188 and the line of movement of the valves at positions other than top and bottom dead centers. This angularity and consequently, the amount of side thrust is kept at a minimum by increasing the length of crank links 188 without increasing the space required for the mehcanism in the manner already fully described.

The valves are held in intimate surface sealing contact by the equally distributed pressure of gas in valve chamber 44. The length of guide rods is such that removal of the valve members is easily and quickly accomplished disconnecting one end of links 188 and moving the valves beyond the limit position defined by said links so that the end of one guide rod is disengaged from the aperture in the respective guide bracket.

The valve plate 38 is of particularly novel construction. Essentially it is dome-shaped with the T-shaped exhaust channel passage 62 depressed from the top wall. At one side of the cross bar of the T-channel passage are spaced pockets also depressed from the top wall and having the ports 72 and 74 at their bottoms for communication to the bellows interiors. At the other side of the T-channel passage cross bar are the spaced ports 58 and 60 between chamber 44 on the one hand and the measuring chambers 34 and 36 on the other hand. All of these passages and the pockets continue through the boss 45 raised above the top side of the plate, and the top edges of the boss 45 are flat faces lying in a plane upon which the valve seat member 128 is placed in assembly with the corresponding ports in registry. Valve seat 128 thus closes the passages and pockets in the valve plate except in registering with the ports 134, 136, 138, 140, 142 and 144, and this assembly of the valve plate and the valve seat element reduces the intricacy of the valve plate casting and permits latitude in location of the pockets and passages.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gas meter, a housing comprising a body having a central partition dividing it into side by side individual measuring chambers, a valve plate assembly removably secured across said body and closing the top of each said measuring chamber except for side-by-side groups of valve ports in the valve plate assembly, a flexible walled bellows unit suspended in each measuring chamber, each unit having a conduit connected to a separate upwardly open pocket in said valve plate, a cover removably secured to said body independently of and over said valve plate assembly to provide a gas intake chamber between the cover and the valve plate assembly, each said group of valve ports comprising an inlet port for connecting said intake chamber directly to the associated measuring chamber, a bellows discharge port communicating with one of said pockets in the valve plate and an intermediate exhaust port, a passage in said valve plate assembly connecting said exhaust ports together and having an upwardly open mouth remote from said valve seats, a gas intake in the top of said cover opening into said intake chamber, a gas exhaust in the top of said cover and comprising a conduit section extending through said intake chamber and connected in gas tight relation to said exhaust passage mouth when the cover is secured to said body, and control valves slidable in synchronism over said valve ports operatively connected to said bellows units.

2. In the gas meter defined in claim 1, said mouth being surrounded by a channel containing a resilient seal annulus, and said conduit section of the cover interfitting with said channel to compress said annulus when the cover is secured to said body.

3. In a gas meter, a valve plate having a chiefly upwardly open T-shaped exhaust passage defining depression, the leg of said T terminating in an upwardly open mouth, two port openings through said plate parallel to and adjacent the oppositely extending arms of said T, two pockets depressed in said valve plate adjacent said arms of the T but on opposite sides from said openings and having bellows conduit connections in the bottom, a raised boss on said valve plate through which said T-shaped passage, said port openings and said pockets all extend, and a unitary valve seat member removably mounted upon said boss, said valve seat member being formed with two laterally aligned spaced exhaust ports each open to one arm of said T-shaped passage, two laterally aligned spaced inlet ports each open to one of said port openings through the valve plate and two laterally aligned spaced bellows discharge ports each open to one of said pockets, said valve seat member otherwise mainly closing said passage, port openings and pockets from above.

4. In a gas meter, an open top body member having an internal partition dividing said body member into isolated measuring chambers, a valve plate secured upon the open top of said body member and carrying bellows structures disposed within the respective chambers, a cover secured upon the top of said body member and enclosing a plenum chamber overlying said valve plate, an exhaust channel formed in said valve plate having an exhaust port at one end, an inlet port in said cover opening into said chamber, an exhaust fitting on said cover, an internal tubular boss on the cover connecting the exhaust fitting with said exhaust port, means including a valve seat member secured to said valve plate defining two groups of aligned, contiguous ports in said valve plate, and coplanar valve seats therefor each group comprising spaced ports normally placing said plenum chamber in communication with one of said measuring chambers and with the associated bellows respectively and an intermediate port in constant communication with said exhaust channel, a pair of gears mounted on said valve plate adjacent the corresponding ends of said groups of ports and for rotation about axes aligned with the respective groups and normal to the plane of said valve seats, valve members slidably disposed on said valve seats and adapted upon colinear reciprocation to alternately connect one of said spaced ports with said intermediate port while opening the other spaced port to said plenum chamber, a crank link pivotally connected at one end to each of said gears, the other end of each crank link extending over the respective valve members and being pivotally secured to the end of said valve member remote from the respective gear, a gear shaft mounted on said valve plate for rotation about an axis parallel to an intermediate the axes of said pair of gears, an additional gear mounted on said shaft for rotation therewith and intermeshing said pair of gears with their respective crank pins 90° out of phase, and means operatively connecting said bellows structures to said additional gear whereby reciprocation of said bellows rotates said additional gear.

5. In the gas meter defined in claim 4, said last mentioned means comprising a radial tangent rod fixedly secured to said shaft, a pair of brackets dependingly secured to the underside of said valve plate and disposed within said measuring chambers, a step bearing in the lower end of each of said brackets, a pair of straight parallel flag rods having their lower ends rotatably supported in said step bearings and their upper ends sealingly journaled in said valve plate and extending into said plenum chamber, radial arms in said measuring chambers non-rotatably secured at one end to said flag rods and pivotally connected at the other end to said bellows structures, a pair of crossed radial levers in said valve chamber non-rotatably secured to the upper ends of said flag rods, and a pair of links pivotally secured at one end to said tangent rod and at the other end, respectively, to the free ends of said radial levers.

6. In the gas meter defined in claim 5, guide means for constraining said valve members to a rectilinear path of movement comprising a guide bracket secured to said valve seat member adjacent each end of said groups of ports intermediate the lateral edges thereof, the brackets for each group including upstanding lugs offset in opposite directions transversely to the axis of reciprocation of said valve members and containing axial slots normal to the axis of reciprocation, and guide rods extending oppositely from each end of said valve members and parallel to the axis of reciprocation and slidably received in the slots of said guide brackets.

7. In a gas meter, an open top body member, a ported valve plate secured upon said body member to close the opening thereof and carrying bellows structures disposed therein, valve seats on said plate, a slide valve on each of said seats, a pair of straight parallel flag rods extending perpendicularly through said valve plate, brackets depending from the underside of said valve plate, step bearings on said brackets rotatably supporting the lower ends of said flag rods, an arm non-rotatably secured to each of said flag rods and pivotally secured to said bellows structures, and means including a pivoted linkage operatively connecting the upper ends of said flag rods to actuate said valves.

8. In a gas meter, a valve plate adapted to be mounted between an input plenum chamber on one side and a body portion having a plurality of individual measuring chambers on the other side of said plate, said valve plate containing a substantially T-shaped depressed portion on said one side defining an exhaust passageway, two pairs of openings through said plate, each of said pairs located adjacent opposing sides of each arm of said T-shaped portion, one opening of each pair having a bellows conduit connected on said other side of the plate, a raised boss on said plate surrounding said T-shaped portion and said pairs of openings, a unitary valve seat member removably secured to said boss, said valve seat member having two laterally spaced apertures with each of said apertures aligned and generally coextensive with one arm of said T-shaped portion and the adjacent pair of openings, and valve means associated with each of said apertures and mounted for sliding movement in a direction parallel to the leg of said T-portion to cause each of said valves to alternately provide in succession a fluid passageway between its associated arm of the T-shaped portion and one of the adjacent openings.

9. In a gas meter, a housing comprising a plenum input chamber and a body portion having a plurality of individual measuring chambers, a valve plate, means to mount said plate between said input chamber and said body portion, a T-shaped channel formed in said plate, two pairs of openings extending through said plate, the openings of each pair being adjacent opposite sides of the arms of said T-shaped channel, a valve seat member secured to said plate covering said T-shaped channel and having spaced ports aligned with said two pairs of openings and an intermediate port for each arm of said T-shaped channel, a valve member associated with each intermediate port, and means for imparting reciprocating motion to said valve members to alternately connect one of said spaced ports with said intermediate port, said means comprising a pair of gears mounted on said valve plate, a crank link pivotally connected at one end to each of said gears, the other end of each crank member extending over the respective valve member and being pivotally secured to the end of the valve member remote from its associated gear, a third gear mounted on said valve plate in mesh with said pair of gears, and means driving said third gear to impart rotating motion to all of said gears.

10. In a gas meter having an input chamber and a body portion, said body portion containing a central partition dividing it into side by side individual measuring chambers, a valve plate between said input chamber and said body portion having a T-shaped exhaust passage defining depression with upwardly extending side walls forming a first boss portion which extends around the margin of said T-shaped passage, two port openings through said plate adjacent the oppositely extending arms of the T-shaped passages and on opposite sides of and adjacent the leg of the T-shaped passage, two pockets with apertures extending through said plate depressed in the valve plate adjacent the oppositely extending arms of the T-shaped passage but on opposite sides of the arms from said openings, an additional boss portion formed of upwardly extending side walls flush with the walls of said first boss surrounding said port openings and said pockets, a valve seat member secured in a sealed relationship with the flush surfaces of said bosses, said valve seat member having a series of openings corresponding with each of said oppositely extending arms, said port openings and said pockets, a separate valve element associated with said series of openings on said valve seat member for each of said oppositely extending arms and means to reciprocably drive each valve element to alternately connect in a fluid relationship the arms of said T-shaped portion with its associated port opening and pocket aperture.

11. A gas meter valve plate comprising an integral surface formation defining an upwardly open closed bottom exhaust passage, at least two spaced measuring chamber connection passages open at both top and bottom through the plate and at least two spaced bellows connection passages open at top and bottom through the plate, part of said exhaust passage being defined by a side extension of said integral formation, and said extension comprising an integral bridge laterally crossing the upper end of said part of the exhaust passage intermediate the ends thereof, said bridge and the extension walls therebeyond defining an upwardly facing open exhaust conduit seat.

12. In combination with the gas meter valve plate defined in claim 11, a removable apertured valve seat member secured upon said integral surface formation and having a portion extending as a closure over said exhaust passage part up to said bridge, and an exhaust conduit having its inner end mounted in fluid tight assembly upon said seat.

13. In a gas meter, a body having an internal cross wall dividing it into two measuring chambers open at the top, a rim extending around the upper periphery of the body, a valve plate extending over the tops of said chambers and peripherally removably secured to said rim, means on the bottom of the plate in fluid tight sealing contact with the top of said wall, integral surface formations on said valve plate defining an upwardly open closed bottom exhaust passage, at least two spaced passages through the plate each connected to a separate measuring chamber and two other spaced open top and bottom passages through the plate, bellows units disposed within each measuring chamber, and two conduits each disposed in a separate measuring chamber and connected between one of said other passages and a bellows unit for suspending the latter from the plate, spaced upwardly open recesses in said plate adjacent the bottoms of said other passages, and removable fastener means in the bottoms of said recesses and said exhaust passage for securing said conduits to said plate.

14. In a gas meter, a body having an internal wall dividing it into two upwardly open measuring chambers, a peripheral rim around the upper end of said body, a valve plate assembly mounted across the top of said body measuring chambers and removably secured to said body at said rim, said valve plate assembly being formed to provide a closed bottom exhaust passage and at least two spaced through passages opening down into the measuring chambers respectively, bellows units disposed in each measuring chamber each having a conduit removably secured to said plate assembly in communication with two other spaced through passages in the plate assembly, a top cover removably mounted on said body by fluid tight sealing and fastening means extending about said rim outwardly of said plate assembly and defining a plenum chamber above the plate assembly, said exhaust passage having an upwardly facing discharge opening at one end, a gas inlet fitting on said cover opening into said chamber, a gas exhaust fitting on said cover, a conduit rigid with said cover extending from said fitting into gas tight seating engagement with said valve plate assembly around said opening, valves for said passages mounted on said plate assembly, and means connected to said bellows units for operatively driving said valves.

References Cited in the file of this patent
UNITED STATES PATENTS

| | | |
|---|---|---|
| 1,025,385 | English | May 7, 1912 |
| 1,850,619 | England | Mar. 22, 1932 |
| 2,544,665 | Gilmore | Mar. 13, 1951 |
| 2,599,514 | Menkemeller | June 3, 1952 |
| 2,667,147 | Brown | Jan. 26, 1954 |